United States Patent [19]

Miura

[11] Patent Number: 4,788,560

[45] Date of Patent: Nov. 29, 1988

[54] MULTI-BEAM SCANNING SYSTEM WITH TIME SHARING BEAM CONTROL

[75] Inventor: Kunihiko Miura, Hiratsuka, Japan

[73] Assignee: Kabushiki Kaisha Toshiba, Kawasaki, Japan

[21] Appl. No.: 136,934

[22] Filed: Dec. 23, 1987

[30] Foreign Application Priority Data

Dec. 26, 1986 [JP] Japan ................. 61-315396

[51] Int. Cl.⁴ .................. G01D 9/42; G11B 7/00
[52] U.S. Cl. .................... 346/108; 369/116; 358/296
[58] Field of Search ............. 346/108, 107 R, 160, 346/76 L; 358/296, 298, 300, 302; 369/116

[56] References Cited

U.S. PATENT DOCUMENTS 4,423,426 12/1983 Kitamura ..................... 346/108
4,717,925  1/1988 Shibata ........................ 358/296

*Primary Examiner*—E. A. Goldberg
*Assistant Examiner*—Mark Reinhart
*Attorney, Agent, or Firm*—Foley & Lardner, Schwartz, Jeffery, Schwaab, Mack, Blumenthal & Evans

[57] ABSTRACT

A plurality of light sources generate beams having predetermined light amounts, respectively. An optical scanner receives the beams from the plurality of light sources and directs the beams as a plurality of scanning beams to an object to be scanned. A photodetector has a predetermined number of photosensors smaller than that of the plurality of light sources and substantially detects light amounts of the plurality of scanning beams by the optical scanner in a time sharing manner. A controller outputs a control signal for independently controlling the light amounts of the respective beams from the plurality of light sources in accordance with time-sharing light amount detection signals corresponding to the plurality of scanning beams from the photosensors of the predetermined number.

15 Claims, 12 Drawing Sheets

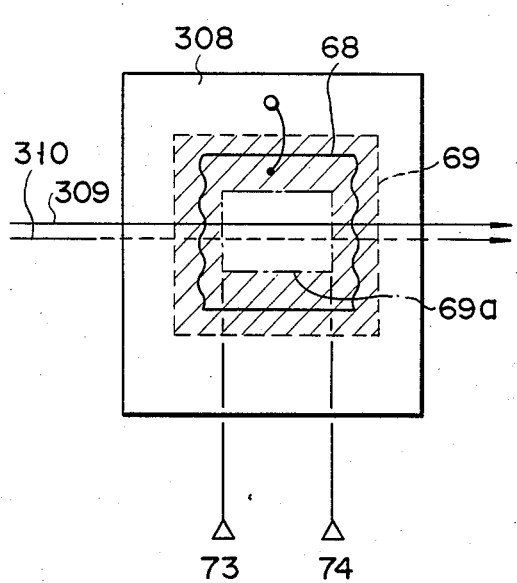 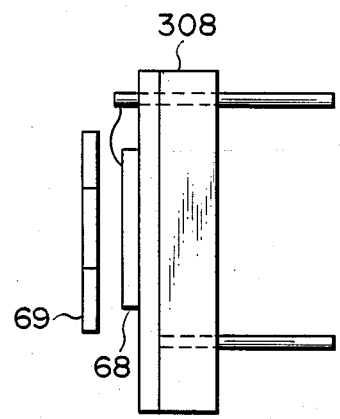
F I G. 7A     F I G. 7B

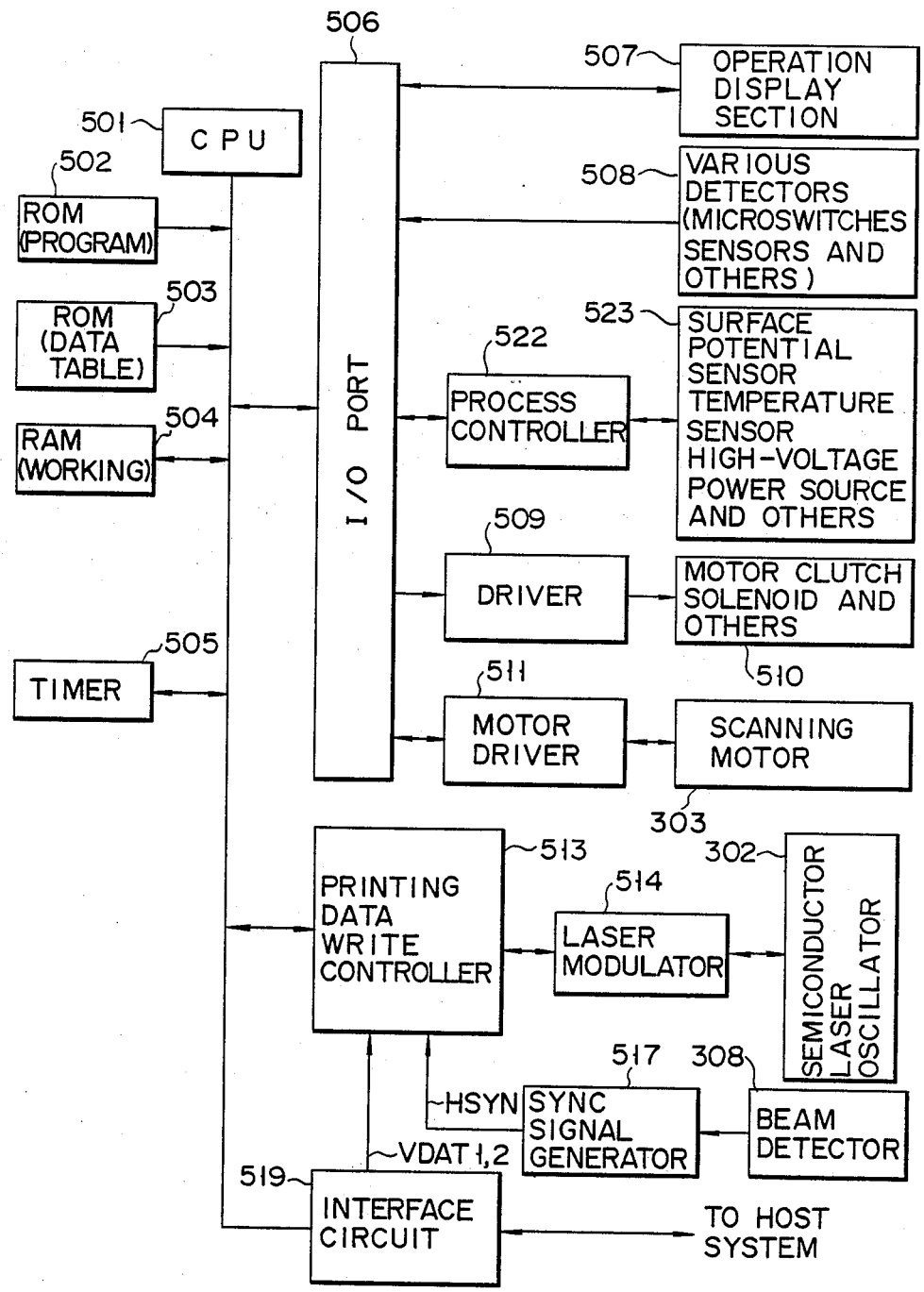
F I G. 8

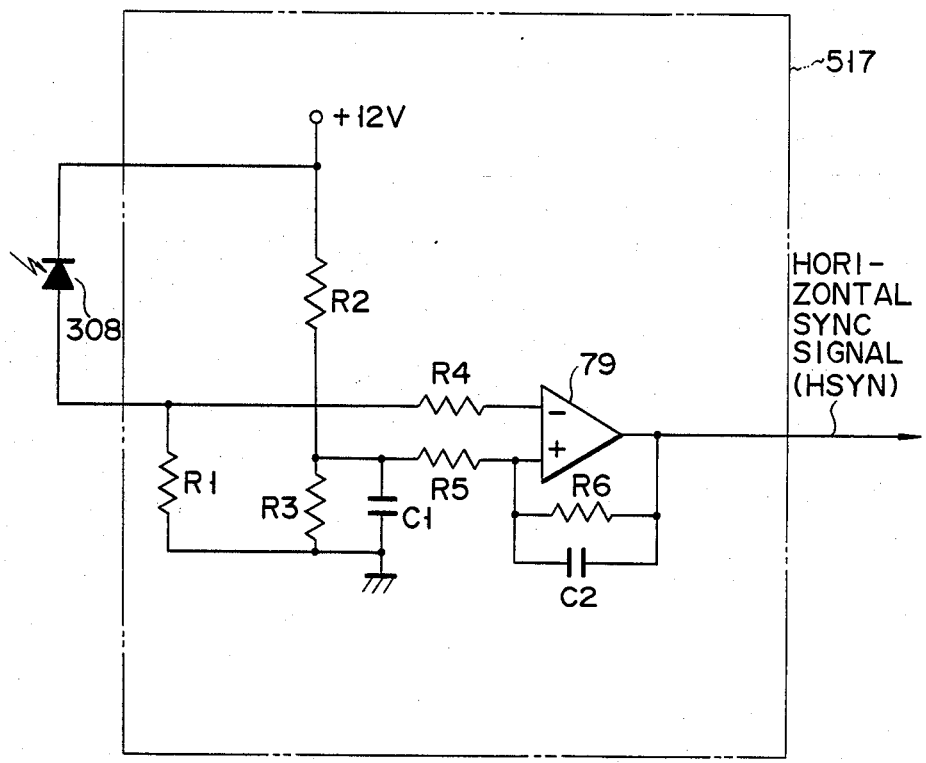
F I G. 9

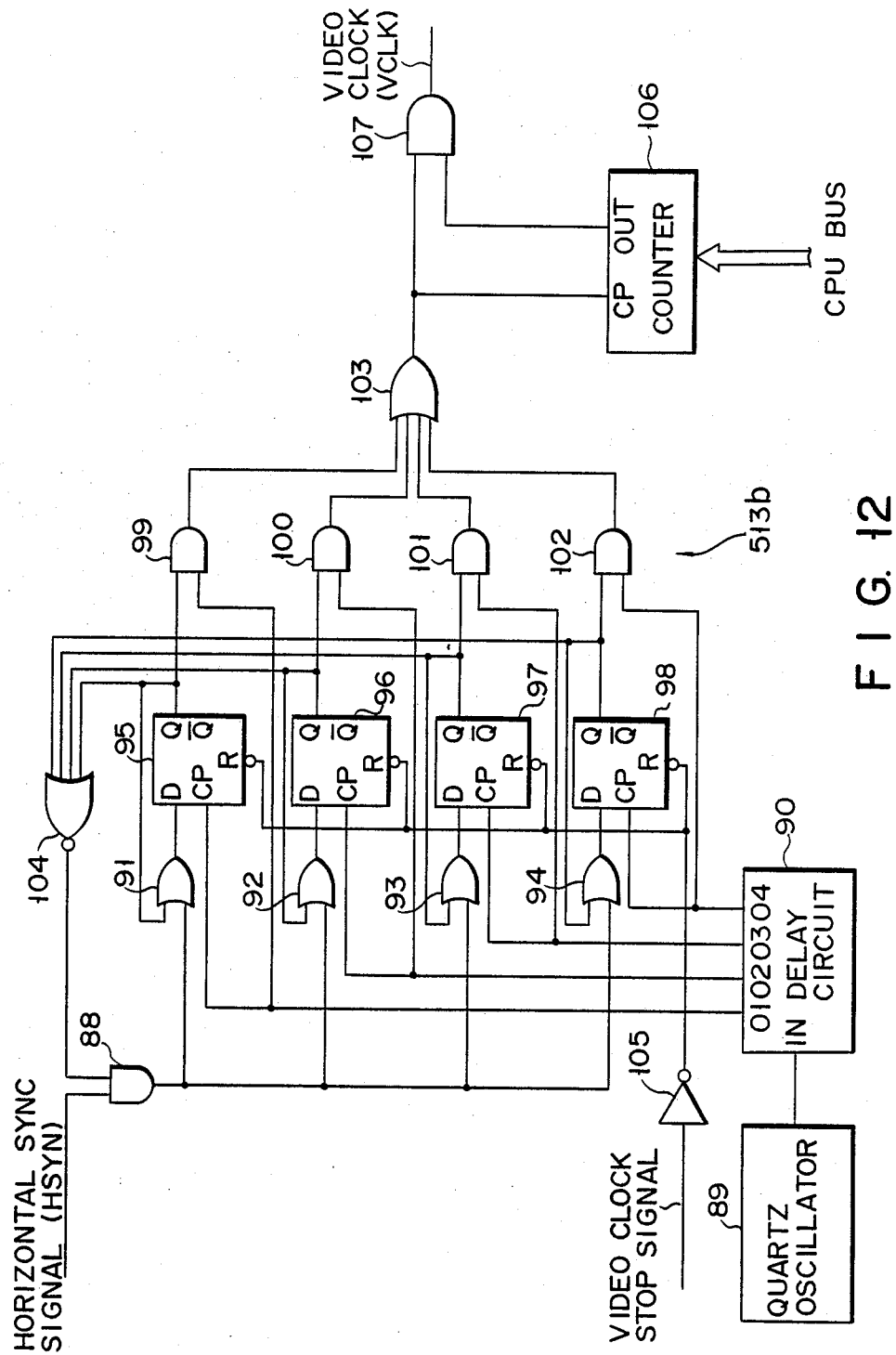
F I G. 12

MULTI-BEAM SCANNING SYSTEM WITH TIME SHARING BEAM CONTROL

BACKGROUND OF THE INVENTION

This invention generally relates to a multi-beam scanning system with a time sharing beam control and, more particularly, to an image forming apparatus such as a laser printer having a scanning exposure step by a multi-laser beam and a printing step by an electrophotographic process.

Recently, a laser printer having a scanning exposure step by a laser beam and a printing step by an electrophotographic process has been realized.

As a laser printer of this type, a printer adopting a multi-beam scanning system has recently been developed. In this printer, a plurality of beams are generated and a plurality of lines are scanned by these beams, thereby increasing a printing speed.

In such a laser printer, in order to generate a plurality of beams, a plurality of light sources (laser diodes) independently housed in different cases are used. In addition, in order to control each beam, a light amount monitoring element (photodiode) is used together with each laser diode. That is, a light amount of each laser beam is independently controlled in accordance with an output from each light amount monitoring element.

For this reason, in a conventional multi-beam scanning laser printer, light amount controllers must be provided in a number corresponding to that of scanning beams. As a result, an overall arrangement of the apparatus is complicated, and the apparatus becomes expensive.

SUMMARY OF THE INVENTION

It is, therefore, an object of the present invention to provide a new and improved multi-beam scanning apparatus in which a drawback of the conventional apparatus that light amount controllers must be provided in a number corresponding to that of scanning beams can be eliminated, i.e., a single light amount controller need only be provided, thereby realizing a simple arrangement and an inexpensive apparatus.

It is another object of the present invention to provide a multi-beam scanning type image forming apparatus in which a light amount controller can be simplified.

According to one aspect of the present invention, there is provided a multi-beam scanning apparatus comprising:

a plurality of light sources each for generating a beam;

optical scanning means for receiving the beams from the plurality of light sources and directing the beams as a plurality of scanning beams to an object to be scanned;

photodetecting means, having a predetermined number of photosensors smaller than that of the plurality of light sources, for substantially detecting light amounts of the plurality of scanning beams by the optical scanning means in a time sharing manner; and control means for controlling the light amounts of the respective beams from the plurality of light sources in accordance with time-sharing light amount detection signals corresponding to the predetermined number of photosensors of the photodetecting means.

BRIEF DESCRIPTION OF THE DRAWINGS

These and other objects and features of the present invention can be understood through the following embodiment by reference to the accompanying drawings, in which:

the drawings illustrate an embodiment of the present invention, and

FIGS. 7A and 7B are views for explaining an arrangement of a beam detector;

FIG. 8 is a block diagram of a controller;

FIG. 9 is a circuit diagram of a beam detector;

FIG. 12 is a block diagram of an arrangement of a video clock generator;

DETAILED DESCRIPTION OF THE PREFERRED EMBODIMENT

An embodiment of the present invention will be described below with reference to the accompanying drawings.

Figure 1:
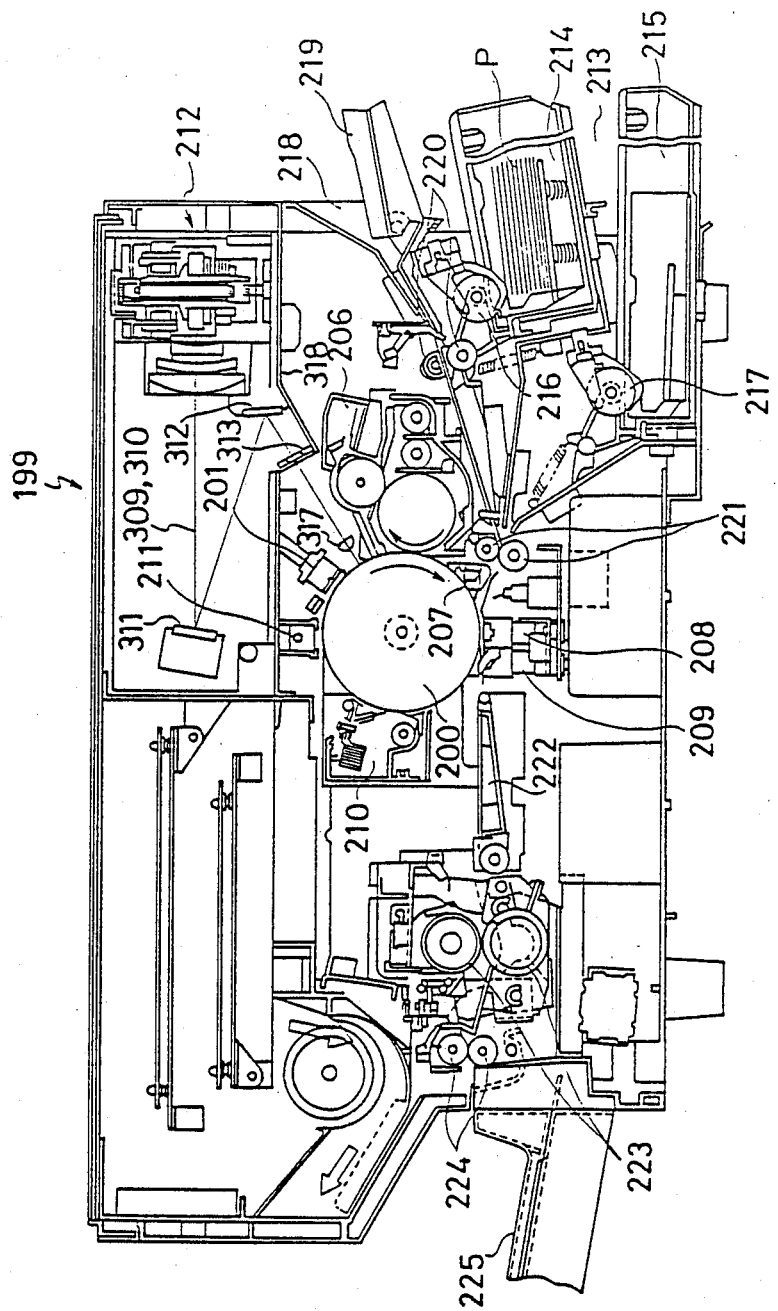
FIG. 1 is a longitudinal sectional front view of an arrangement of a laser printer.

FIG. 1 shows, e.g., laser printer 199 to which an image forming apparatus according to the present invention is applied. This laser printer is connected to a host system such as an external computer or word processor through a cable (not shown) and forms (prints) an image on a sheet of paper in a predetermined color in accordance with dot image data supplied from the host system. In FIG. 1, reference numeral 200 denotes a drum-like photosensitive body as an image carrier which is rotated in an arrow direction by a drive source (not shown). Charger 201, developer 206, pretransfer discharge lamp 207, transfer charger 208, separation charger 209, cleaner 210, and discharger 211 are disposed in the order named around a circumferential surface of photosensitive body 200 along a rotational direction thereof.

Paper feed unit 213 is provided at one side below photosensitive body 200 and supplies paper P to a position below photosensitive body 200. Unit 213 comprises: detachable upper and lower paper feed cassettes 214 and 215 which house a plurality of sheets of paper P; paper feed rollers 216 and 217 for picking up a sheet of paper P one by one from cassettes 214 and 215; manual paper feed tray 219 attached to manual paper feed port 218 formed above upper paper feed cassette 214; a pair of paper feed rollers 220 for feeding paper P supplied from tray 219; and a pair of regist rollers 221 for aligning a leading edge of paper P fed by rollers 216, 217, and 220 and supplying it in synchronism with an image on photosensitive body 200.

Paper P fed by regist rollers 221 is supplied to a section of transfer charger 208 and is brought into contact with the surface of photosensitive body 200 thereat. Therefore, a toner image on photosensitive body 200 is transferred onto paper P by charger 208. Paper P on which the toner image is transferred is electrostatically separated from photosensitive body 200 by separation charger 209 and then conveyed by suction conveyor belt 222 to heat rollers 223 as a fixing unit. When paper P passes between rollers 223, the transferred image on paper P is heated and fixed. After fixing, paper P is discharged to paper discharge tray 225 by a pair of paper discharge rollers 224. In this case, residual toner particles on the surface of photosensitive body 200 after the toner image thereon is transferred are removed by cleaner 210. Then, photosensitive body 200 is discharged by discharger 211 and returns to an initial state.

An optical system will be described in detail below. As shown in FIG. 1, the optical system comprises: single base 318; rotary mirror scanning unit 212; reflecting mirrors 311 and 312 for guiding first and second laser beams 309 and 310 controlled by unit 212 to predetermined positions, respectively; transparent glass 313 for preventing dust from entering into the optical system; lens 317 for correcting beam deflection caused by surface deflection of a polygonal mirror (rotary mirror) to be described later; and a beam detector to be described later.

Figure 2:
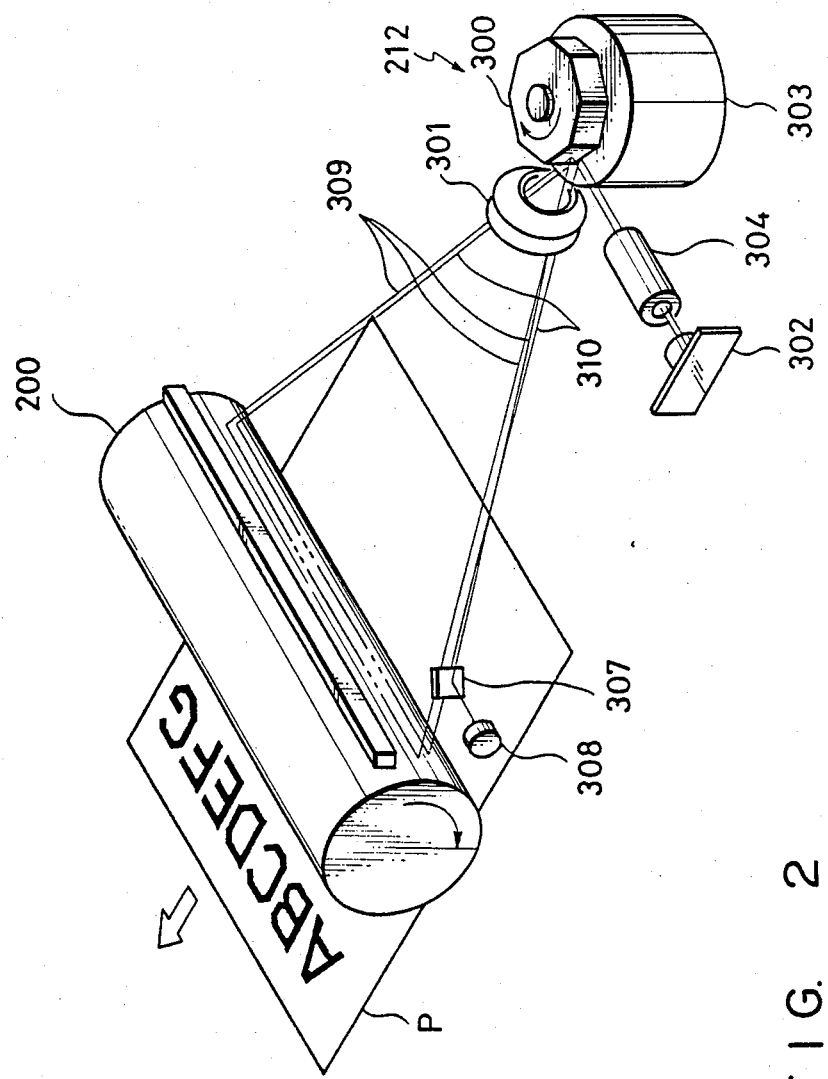
FIG. 2 is a perspective view fo explaining how a laser beam is radiated onto a photosensitive body.

FIG. 2 is a perspective view of the optical system of FIG. 1. In FIG. 2, rotary mirror scanning unit 212 comprises: single semiconductor laser oscillator (beam source) 302 as a main element for emitting two laser beams; collimating lens 304 for collimating the beams emitted from oscillator 302 into parallel beams; polygonal mirror (rotary mirror) 300 having eight octagonally-arranged mirror surfaces for reflecting the two beams from lens 304 in units of scanning lines; scan motor 303 for rotating mirror 300; and F·θ lens 301.

Figure 3:
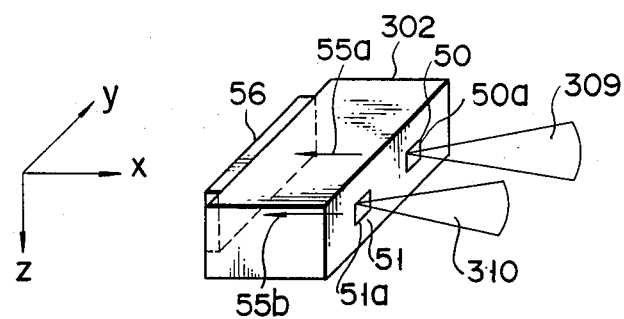
FIG. 3 is a perspective view for explaining an arrangement of a semiconductor laser oscillator.
Figure 4A:
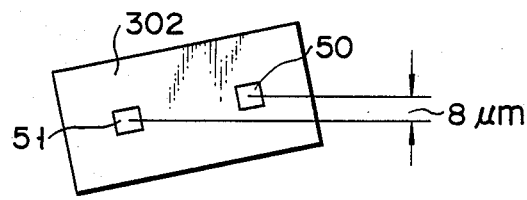
FIGS. 4A to 4C are front views of different types of FIG. 3.
Figure 4B:
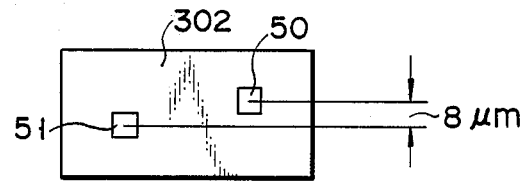
Figure 4C:
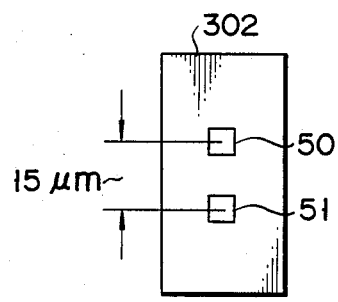

As shown in FIG. 3, oscillator 302 consists of two laser diodes 50 and 51 and two light-emitting points 50a and 51a respectively corresponding to diodes 50 and 51. Diodes 50 and 51 can be driven independently of each other as will be described later. Diodes 50 and 51 are formed on a single semiconductor chip, and a pitch of diodes 50 and 51 in a y-axis direction in FIGS. 4A and 4B is about 200 μm. Diodes 50 and 51 are arranged as follows. First, as shown in FIG. 4A, oscillator 302 is inclined such that a pitch of diodes 50 and 51 in a z-axis direction becomes about 8 um. Second, as shown in FIG. 4B, diodes 50 and 51 are arranged such that the light-emitting positions thereof are offset from each other. Third, as shown in FIG. 4C, diodes 50 and 51 are formed on oscillator 302 such that a pitch of diodes 50 and 51 in the y-axis direction becomes 15 μm and oscillator 302 is arranged upright or inclined slightly. As a result, an interval between a scanning line of first laser beam 309 and that of second laser beam 310 on photosensitive body 200 becomes 80 μm, i.e., corresponds to a printing pitch of 12 lines/mm of a dot printer.

Single photodiode 56 as a photodetector (for monitoring a beam) is provided to oscillator 302 and detects a light amount of the laser beams emitted from laser diodes 50 and 51. The beam amounts of the laser beams emitted from diodes 50 and 51 are maintained constant in accordance with a detection result of photodiode 56 in a manner to be described later. Since photodiode 56 is constituted by a single element, a current output proportional to each light amount of diodes 50 and 51 can be obtained therefrom.

Diodes 50 and 51 emit first and second laser beams 309 and 310 for recording/exposing data to the right in FIG. 3 and third and fourth laser beams 55a and 55b for light amount monitoring to the left therein.

Figure 5:
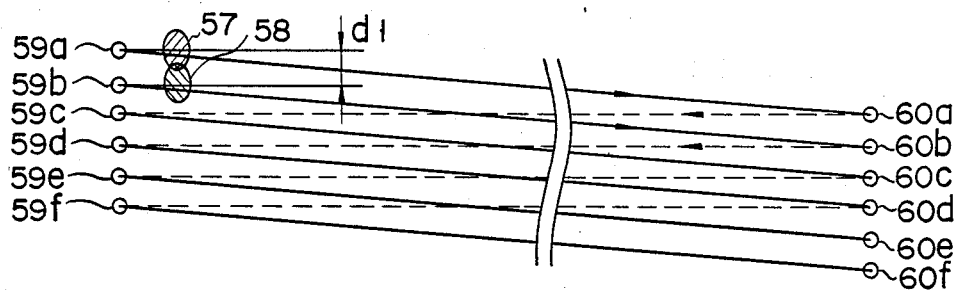
FIG. 5 is a view for explaining how the laser beam scans the photosensitive body.

Two light-emitting points 50a and 51a shown in FIG. 3 are radiated on photosensitive body 200 as two beam spots 57 and 58 located close to each other as shown in FIG. 5 by the optical system shown in FIG. 2. The optical system is arranged such that a distance between the centers of beam spots 57 and 58 corresponds to distance d1 which is the same as a subscanning pitch.

Beam spots 57 and 58 simultaneously scan at a constant speed in a left-to-right direction in FIG. 5 in correspondence to rotation of polygonal mirror 300. Therefore, beam spots 57 and 58 start scanning from points 59a and 59b located at the left end in FIG. 5 and end scanning of two scanning lines at points 60a and 60b. At the same time, beam spots 57 and 58 are returned to the left end by the next mirror surface of mirror 300 and start scanning for the next scanning lines from points 59c and 59d to points 60c and 60d.

In an actual recording operation, the beam intensity is optically modulated in accordance with image data so that oscillator 302 is turned on/off in synchronism with above two-beam scanning and in accordance with the recording density in a main scanning direction. Thus, an electrostatic latent image can be formed on photosensitive body 200 at a predetermined recording density.

Such a two-beam scanning system is characterized in that since two beams scan at the same time, a scanning speed can be reduced to half that of a conventional system in which scanning is performed by a single beam under the conditions that the recording densities and the printing speeds are the same.

Therefore, a rotational speed of the scan motor for driving mirror 300 and a frequency of the video clock in the main scanning direction can be reduced to half. That is, the above system can be used as a very effective means for realizing a high-speed operation of the laser beam printer.

Figure 6:
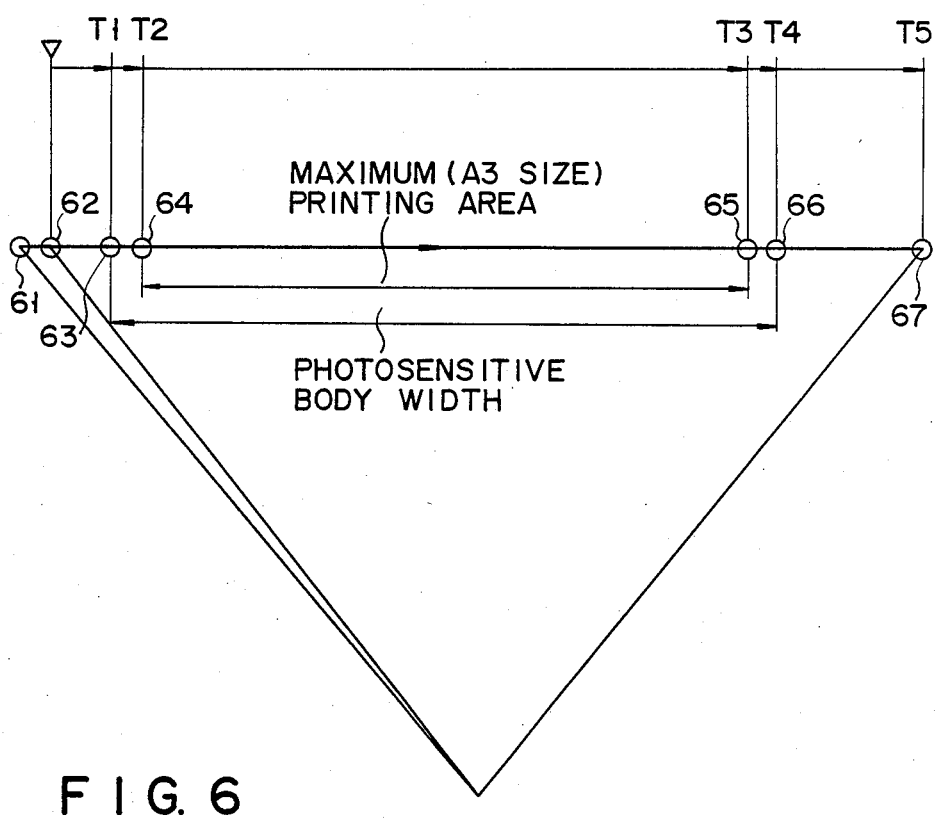
FIG. 6 is a view for explaining a positional relationship between points of the laser beam in a main scanning direction.

A positional relationship of the respective points of beam spots 57 and 58 in the main scanning direction in FIG. 5 will be described below with reference to FIG. 6. That is, reference numeral 61 denotes a beam-scanning start point at the left end; 67, a beam-scanning end point at the right end; 62, a position of beam detector 308; 63, a left end face of photosensitive body 200; 66, a right end face thereof; 64, a printing start point of a maximum printing width; and 65, a printing end point thereof.

A mechanism around beam detector 308 for generating a horizontal sync signal which is essential in printing control of laser printer 199 will be described. In FIG. 2, reflecting mirror 307 is provided at a predetermined position of a scanning range of first and second laser beams 309 and 310 emitted from rotary mirror scanning unit 212, i.e., provided outside an effective printing area. Laser beams 309 and 310 are reflected (deflected) by mirror (light-deflecting portion) 307 and guided to detector 308.

As shown in FIGS. 7A and 7B, detector 308 is constituted by, e.g., PIN photodiode element 68 and mask 69 having rectangular opening 69a for shaping a beam waveform at its central portion. Therefore, output waveform distortion generated when the laser beam passes by an end face portion of element 68 can be prevented by mask 69.

That is, in FIG. 7A, an output can be obtained from element 68 only if laser beam 309 or 310 passes by opening 69a, i.e., left and right end faces 73 and 74 of mask 69 when the beam passes on photodiode element 68.

FIG. 8 shows a control section of laser printer 199 having the above arrangement. That is, reference numeral 501 denotes a CPU (Central Processing Unit) as a main control section for controlling an overall system; 502, a ROM (Read-Only Memory) which stores a control program for operating laser printer 199; 503, a ROM which stores a data table; 504, a RAM (Random Access Memory) as a working memory; 505, a versatile timer for generating fundamental timing signals for control including a predetermined process required for image formation in paper conveyance and around photosensitive body 200; and 506, an I/O port for outputting display data to operation display section 507, receiving inputs from a variety of detectors (e.g., microswitches and sensors), sending an output to driver 509 for driving drive system (consisting of, e.g., a motor, a clutch, and a solenoid) 510, sending an output to motor driver 511 for driving scanning motor 303, and inputting/ outputting with respect to process controller 522 which controls input/output with respect to section 523 including various sensors, a high-voltage power source, and the like.

Reference numeral 513 denotes a printing data write controller which drives laser modulator 514 for modulating laser diodes 50 and 51 of oscillator 302 for writing image data, thereby controlling an operation of optically writing printing data of a video image sent from the external host system at a predetermined position on photosensitive body 200. At this time, detector 308 consisting of a PIN diode of a high-speed response type detects only one of two laser beams 309 and 310 which perform scanning by control of scanning unit 212. Sync signal generator 517 digitizes an analog signal from detector 308 by a high-speed comparator to generate horizontal sync signal HSYN and supplies the signal to controller 513. Reference numeral 519 denotes an interface circuit for outputting status data to the external host system, receiving command data and printing data therefrom, and the like.

As shown in FIG. 9, generator 517 is constituted by bias resistors R1, R2, R3, R4, and R5 for supplying an input and a reference voltage, positive feedback resistor R6, noise removing capacitor C1, high-speed feedback capacitor C2, and high-speed comparator 79.

That is, the output from detector 308 is compared with the reference voltage, and signal HSYN is output as a comparison result.

In this case, only first laser beam 309 is radiated on detector 308, and signal HSYN is output from generator 517 in accordance with a detection signal.

Controller 513 is constituted by laser scan timing controller 513a and video clock generator 513b to be described later.

Figure 10:
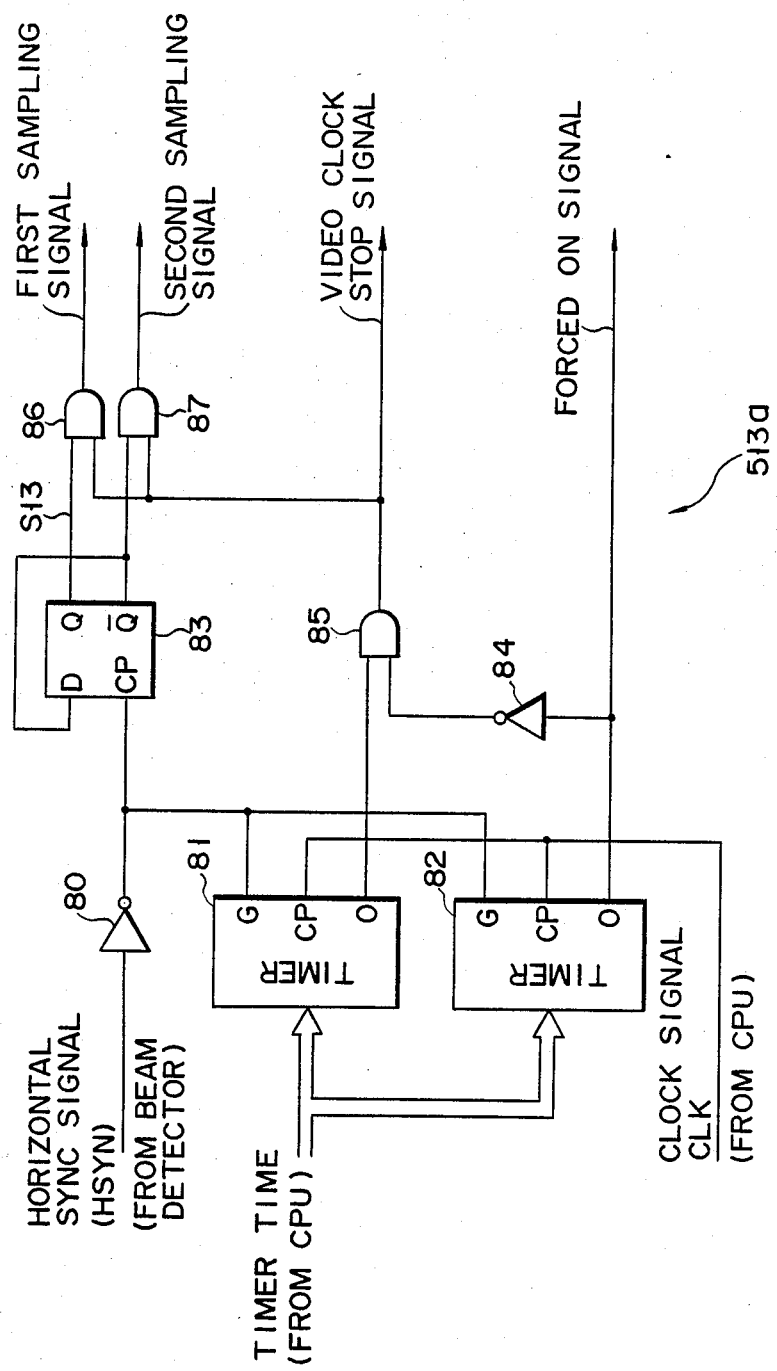
FIG. 10 is an electrical circuit diagram of an arrangement of a laser scan timing controller.

As shown in FIG. 10, controller 513a comprises: inverter 80 for inverting signal HSYN supplied from generator 517; two timers with a gating function (constituted by, e.g., Intel 8253) in which a timer time supplied from CPU 501 through a CPU bus is set and which count output signals from inverter 80 as gate signals (G) and clock signals CLK from CPU 501 as clock pulses (CP); D flip-flop circuit (to be referred to as an FF circuit hereinafter) 83 which is alternately set/reset and therefore outputs a selection signal from set output terminal Q or a reset output terminal $\overline{Q}$ each time the output signal is supplied as clock pulse CP from inverter 80; inverter 84 for inverting a time-out signal from an output terminal (O) of timer 82; AND gate 85 which ANDs the time-out signal from timer 81 with the output signal from circuit 84 and outputs a video clock stop signal; AND gate 86, a gate of which is opened by a set output from FF circuit 83 and outputs the output from AND gate 85 as a sampling signal for monitoring laser diode 50; and AND gate 87, a gate of which is opened by a reset output from AND gate 83 and outputs the output from AND gate 85 as a sampling signal for monitoring laser diode 51.

Figure 11:
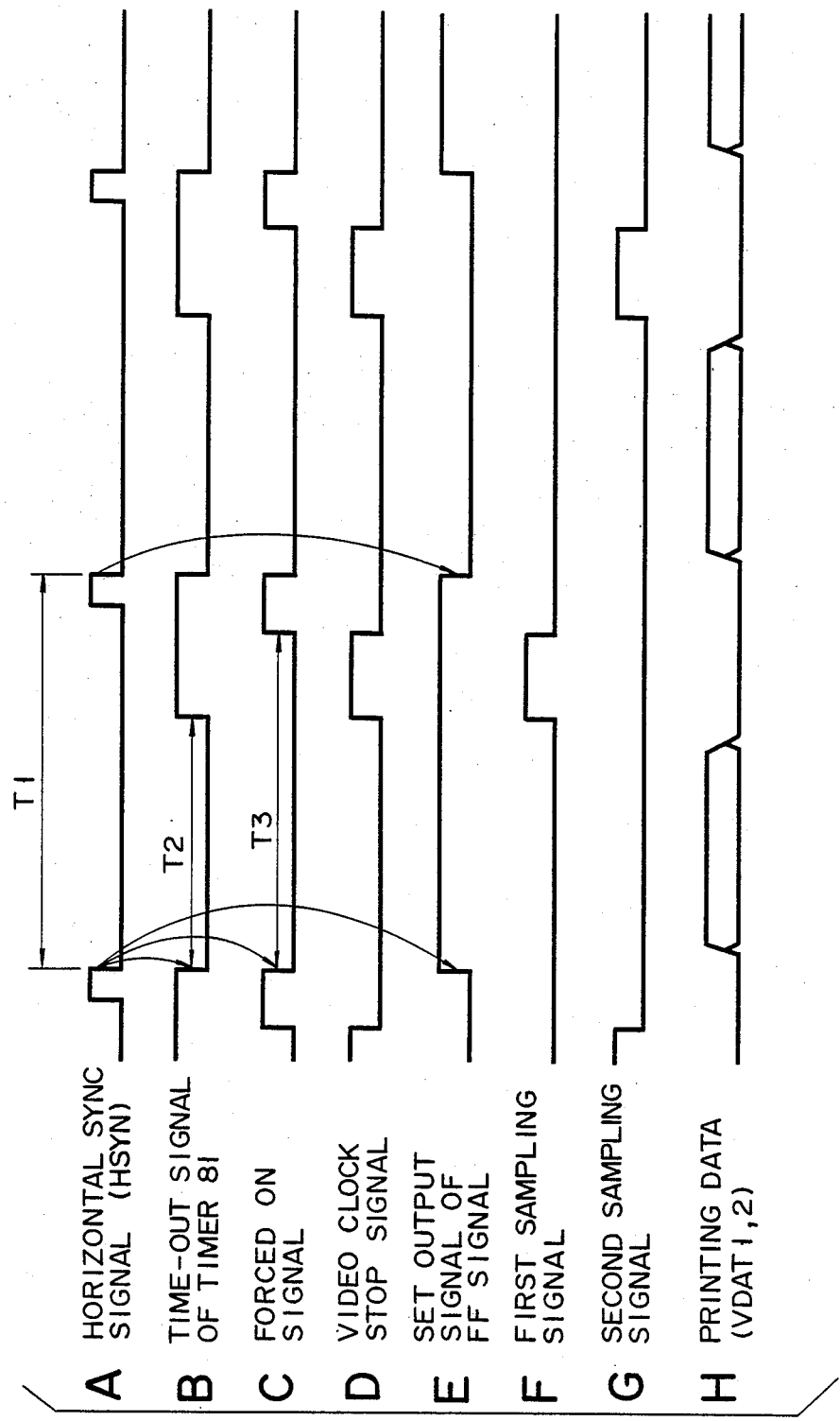
FIGS. 11A to 11H is a timing chart for explaining an operation of FIG. 10.

An operation of laser scan timing controller 513a having the above arrangement will be described below with reference to the timing chart of FIG. 11. That is, signal HSYN supplied from generator 517 is inverted by inverter 80 and supplied to gate terminals G of timers 81 and 82 and clock pulse input terminal CP of FF circuit 83. Therefore, when signal HSYN falls, the gates of timers 81 and 82 are opened to start counting of signals CLK as clock pulses supplied from CPU 501. When signal HSYN falls, a state of FF circuit 83 is also changed, i.e., circuit 83 is set. As a result, the gate of AND gate 86 is kept open by the set output. In addition, since no time-out signal is output from timer 82, the gate of AND gate 85 is kept open by the output from inverter 84.

When the time preset in timer 81 has elapsed, its time-out signal is output as a video clock stop signal to video clock generator 513b through AND gate 85. The output from AND gate 85 is supplied as a first sampling signal to laser modulator 514 through AND gate 86.

When the time preset in timer 82 has elapsed, its time-out signal is supplied as a forced ON signal to modulator 514. In addition, the output from inverter 84 is inverted by the time-out signal from timer 82 and closes the gate of AND gate 85. Therefore, generation of the video clock signal and the first sampling signal is stopped.

When signal HSYN falls, timers 81 and 82 are started and FF circuit 83 is reset. Therefore, the gate of AND gate 87 is kept open by the set output. In addition, since no time-out signal is output from timer 82, the gate of AND gate 85 is kept open by the output from inverter 84.

When the time preset in timer 81 has elapsed, its time-out signal is output as the video clock stop signal to generator 513b through AND gate 85. In this case, the output from AND gate 85 is supplied as a second sampling signal to modulator 514 through AND gate 87.

When the time preset in timer 82 has elapsed, its time-out signal is output as a forced ON signal to modulator 514. In addition, the output from inverter 84 is inverted by the time-out signal and closes the gate of AND gate 85. Therefore, generation of the video clock stop signal and the second sampling signal is stopped.

A cycle time of signal HSYN is T1, an ON time of timer 81 is T2, and an ON time of timer 82 is T3. A relationship between three times T1, T2, and T3 is such that T1 > T3 > T2.

Therefore, AND gates 86 and 87 output the sampling signal with respect to one of laser diodes 50 and 51 each time beam scanning is performed.

As shown in FIG. 12, video clock generator 513b comprises: a series of connected AND gates 88, 99, 100, 101, 102, and 107; quartz oscillator 89 having an oscillation frequency of the same cycle as that of the video clock; delay circuit 90 having four delay time taps provided at equal intervals; OR gates 91, 92, 93, 94, and 103; D flip-flop circuits (to be referred to as FF circuits hereinafter) 95, 96, 97, and 98; NOR gate 104; inverter 105; and counter 106 for counting video clocks from OR gate 103 and outputting video clock signal VCLK from an effective printing area.

An operation of generator 513b having the above arrangement will be described below with reference to the timing chart of FIG. 13. That is, a reference clock of period T is supplied from oscillator 89 to delay circuit 90. Therefore, clocks having periods sequentially delayed by T/4 are output from taps 01, 02, 03, and 04 of delay circuit 90 and supplied to clock pulse input terminals CP of FF circuits 95 to 98, respectively. FF circuits 95 to 98 are cleared by the video clock signal from laser scan timing controller 513a, and the gate of AND gate 88 is opened by the output from NOR gate 104.

In this state, signal HSYN from beam detector 517 is supplied to AND gate 88. Then, "1" signals are output from AND gate 88 and supplied to data input terminals D of FF circuits 95 to 98 through OR gates 91 to 94, respectively.

Figure 13:
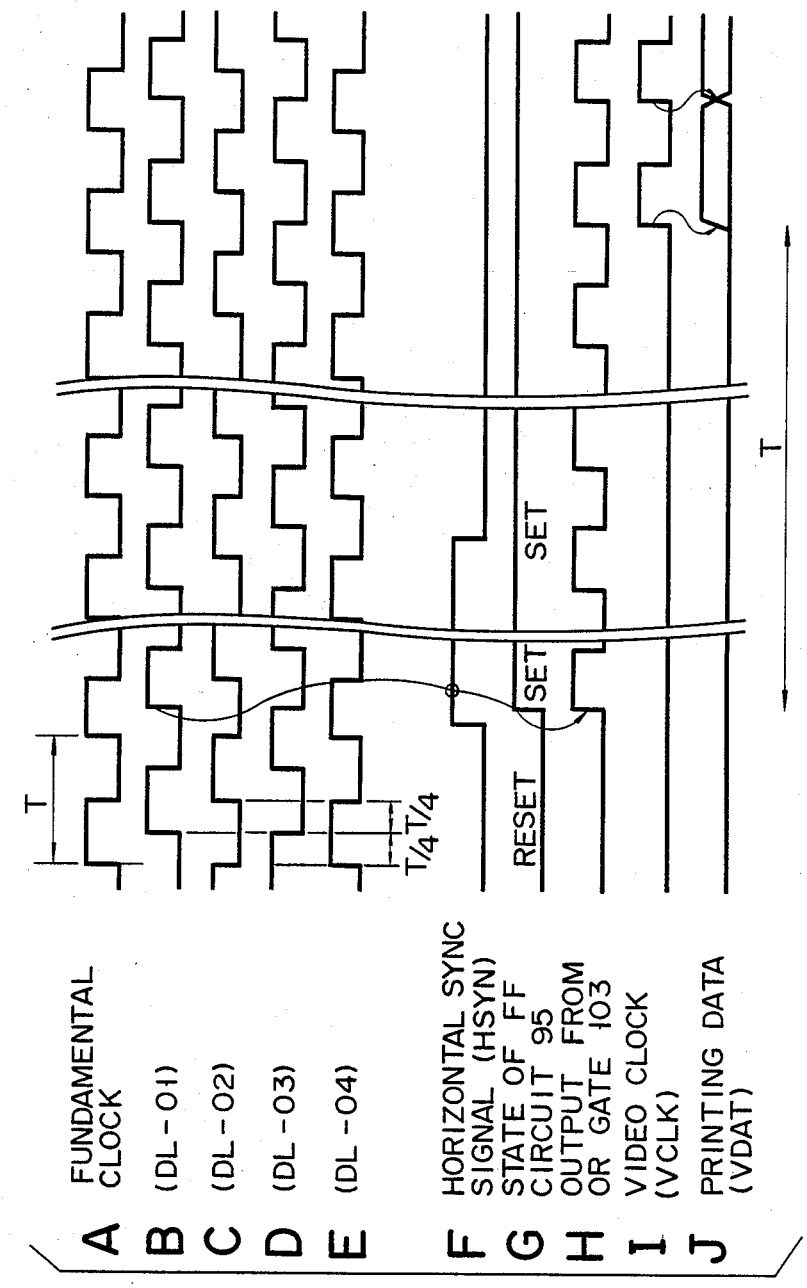
FIGS. 13A to 13J is a timing chart for explaining operation timings of main part of FIG. 12.

In FIG. 13, when a clock from tap 01 of delay circuit 90 rises, FF circuit 95 is set. The gate of AND gate 99 is opened by the set output from FF circuit 95. Therefore, the clock from tap 01 of circuit 90 is output as a video clock to AND gate 107 and counter 106 through AND gate 99 and OR gate 103.

An output from NOR gate 104 becomes a "0" signal by the set output from FF circuit 95 and closes the gate of AND gate 88. In addition, the set output from FF circuit 95 is supplied to data input terminal D of FF circuit 95 through OR gate 91. Therefore, only FF circuit 95 is kept set.

When counter 106 reaches a count corresponding to a recording start position, the gate of AND gate 107 is opened, and video clock VCLK from OR gate 103 is output.

In accordance with clock VCLK, printing data VDAT1 and VDAT2 supplied from interface circuit 519 are output to modulator 514.

Similarly, when clocks from other taps 02 to 04 of delay circuit 90 rise and corresponding FF circuits 96 to 98 are set, the clocks from taps 02 to 04 are output as clocks VCLK.

Figure 14:
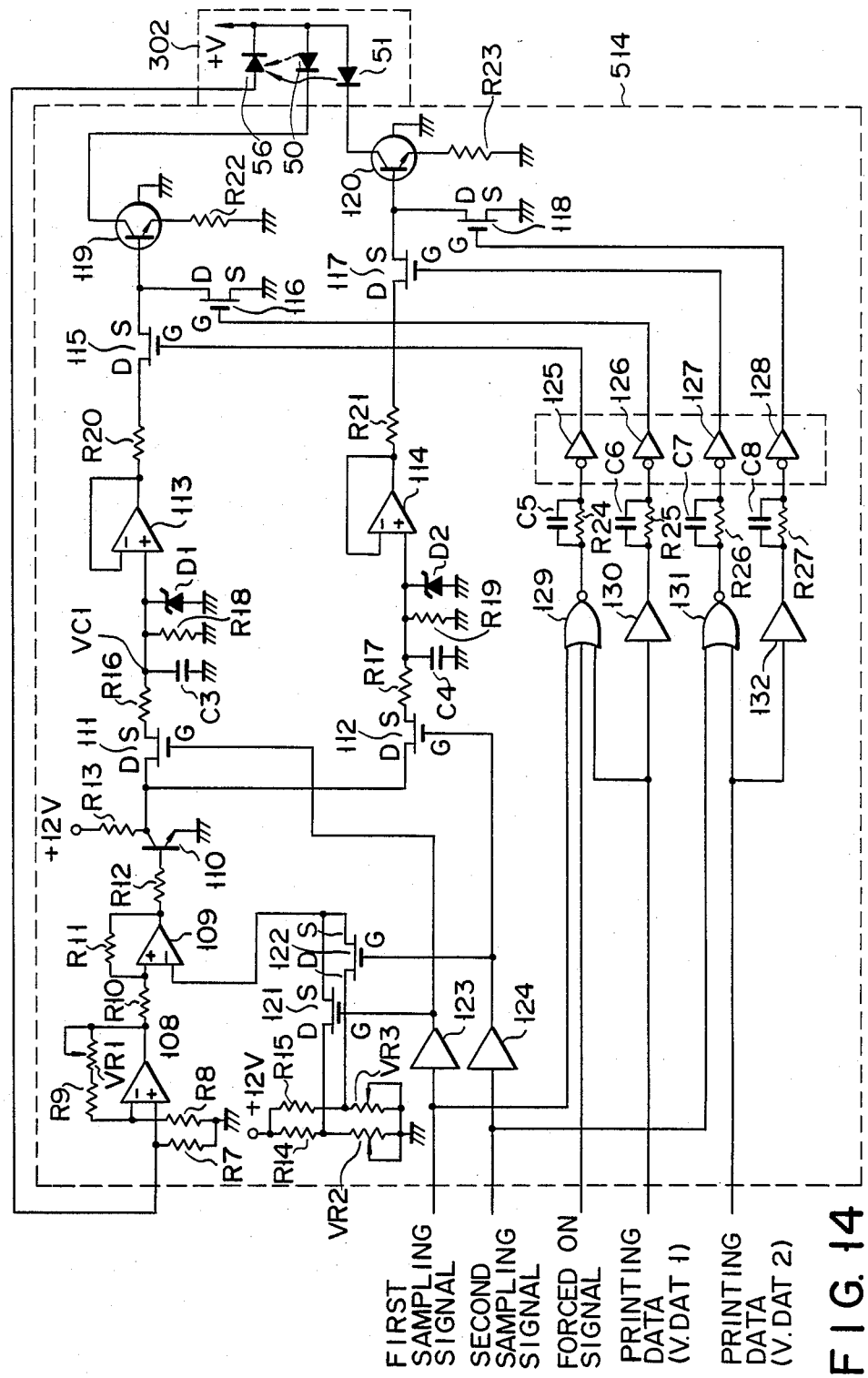
FIG. 14 is an electrical circuit diagram of an arrangement of a laser modulator.

Laser modulator 514 will be described below with reference to FIG. 14. That is, modulator 514 comprises: operational amplifier 108 for amplifying a monitor signal obtained by converting a voltage of an output current from monitoring photodiode 56; comparator 109 for comparing an output signal from amplifier 108 with a laser light amount control reference voltage obtained by resistor R14, variable resistor VR2, resistor R15, and variable resistor VR3; inverting transistor 110; analog switches 111 and 121 which are turned on at a channel 1 side, i.e., when a light amount of laser diode 50 is to be controlled; analog switches 112 and 122 which are turned on at a channel 2 side, i.e., when a light amount of laser diode 51 is to be controlled; operational amplifiers 113 and 114 for following voltages, i.e., converting impedances of voltages VC1 and VC2 charged by capacitors C3 and C4; high-speed transistors 119 and 120 for controlling currents to be flowed through diodes 50 and 51; analog switches 115 and 117 which are turned on when diodes 50 and 51 are turned on; analog switches 116 and 118 which are turned on when diodes 50 and 51 are turned off; buffers 125 to 128, 123 and 124 for driving switches 115 to 118, 121 and 122, respectively; NOR gates 129 and 131; and buffers 130 and 132.

An operation of laser modulator 514 having the above arrangement will be described below with reference to the timing chart of FIG. 11. That is, when the first sampling signal is supplied from laser scan timing controller 513a, analog switches 111 and 121 are turned on by the first sampling signal. In addition, an output from NOR gate 129 becomes "0" by the first sampling signal, and hence switch 115 is turned on. At this time, since capacitor C3 is not charged, an output from amplifier 113 is at 0V, and the base of transistor 119 is also at 0V. Therefore, laser diode 50 does not emit light at this time. In this case, a monitor current of photodiode 56 is also at 0V, and an output of 0V is supplied from amplifier 108. Then, an output from comparator 109 is switched to level "L", and transistor 110 is turned off. Since transistor 110 is kept off, capacitor C3 is charged. An output voltage from amplifier 113 is gradually increased because capacitor C3 is charged, and a collector current of transistor 119 is also increased. When the collector current of transistor 119 reaches a forward current, laser diode 50 emits light.

Thereafter, while the first sampling signal is kept supplied, diode 50 is controlled to emit a predetermined amount of light in accordance with the monitor current of photodiode 56.

Similarly, when the second sampling signal is supplied, switches 112 and 122 are turned on by the second sampling signal. In addition, an output from NOR gate 131 is switched to "0" by the second sampling signal. Then, switch 117 is turned on. At this time, since capacitor C4 is not charged, an output from amplifier 114 is at 0V, and the base of transistor 120 is at 0V. Therefore, laser diode 51 does not emit light at this time. In this case, the monitor current of photodiode 56 is also at 0V, and the output of 0V is supplied from amplifier 108. Then, the output from comparator 109 is switched to level "L", and transistor 110 is turned off. Since transistor 110 is kept off, capacitor C4 is charged. An output voltage from amplifier 114 is gradually increased because capacitor C4 is charged, and a collector current of transistor 120 is increased. When the collector current of transistor 120 reaches the forward current, laser diode 51 emits light.

Thereafter, while the second sampling signal is kept supplied, diode 51 is controlled to emit a predetermined amount of light in accordance with the monitor current of photodiode 56.

A case wherein printing data VDAT1 and VDAT2 are supplied from interface circuit 519 to buffers 130 and 132 and NOR gates 129 and 131, respectively, will be described below. In this case, since the first and second sampling signals are not supplied, capacitors C3 and C4 are kept charged.

Therefore, switch 116 is turned on/off in accordance with data VDAT1 output from buffer 130, and switch 115 is turned on/off in accordance with an output from NOR gate 129. Thus, laser diode 50 emits/does not emit light.

That is, when data VDAT1 is "1", switch 115 is turned on, and switch 116 is turned off, so that diode 50 emits light. When data VDAT1 is "0", switch 115 is turned off, and switch 116 is turned on, so that diode 50 does not emit light.

In accordance with data VDAT2 output from buffer 132, switch 118 is turned on/off, and switch 117 is turned on/off in accordance with an output from NOR gate 131. Thus, laser diode 51 emits/does not emit light.

That is, when data VDAT2 is "1", switch 117 is turned on, and switch 118 is turned off, so that diode 51 emits light. When data VDAT2 is "0", switch 117 is turned off, and switch 118 is turned on, so that diode 51 does not emit light.

Assume that the forced ON signal is supplied to NOR gate 129. In this case, since the first and second sampling signals are not supplied, capacitors C3 and C4 are kept charged.

Therefore, switch 115 is turned on in accordance with a "0" signal output from NOR gate 129, and only diode 50 emits light. Since only diode 50 emits light, only beam detector 308 is irradiated.

As described above, two laser diodes generate two laser beams as scanning beams, and light amounts of the two laser beams are independently detected by a single beam detector in a time sharing manner, thereby controlling light-emitting operations of the laser diodes in accordance with respective detection results. Therefore, only a single beam detector and a single light amount controller are required.

As has been described above, according to the present invention, there is provided a multi-beam scanning system in which only a single light amount controller is required and an arrangement can be simplified.

What is claimed is:

1. A multi-beam scanning apparatus comprising:
   a plurality of light sources each for generating a beam;
   optical scanning means for receiving the beams from said plurality of light sources and directing the beams as a plurality of scanning beams to an object to be scanned;
   photodetecting means, having a predetermined number of photosensors smaller than that of said plurality of light sources, for substantially detecting light amounts of the plurality of scanning beams by said optical scanning means in a time sharing manner; and
   control means for controlling the light amounts of the respective beams from said plurality of light sources in accordance with time-sharing light amount detection signals corresponding to said predetermined number of photosensors of said photodetecting means.

2. An apparatus according to claim 1, wherein the light amounts of the respective beams generated by said plurality of light sources are independently set.

3. An apparatus according to claim 1, wherein said plurality of light sources comprise a plurality of semiconductor lasers.

4. An apparatus according to claim 3, wherein said plurality of semiconductor lasers are formed on a single chip.

5. An apparatus according to claim 1, wherein the number of said photosensors of said photodetecting means is one.

6. An apparatus according to claim 1, wherein said photosensors of said photodetecting means are provided integrally with said plurality of light sources.

7. A multi-beam scanning apparatus comprising:
   laser oscillating means for outputting first and second scanning laser beams in a first direction and outputting first and second monitoring laser beams having light amounts respectively corresponding to light amounts of the first and second scanning laser beams in a second direction;
   laser monitoring means for commonly receiving the first and second monitoring laser beams from said laser oscillating means and outputting monitoring signals respectively proportional to received light amounts;
   optical scanning means for receiving the first and second scanning laser beams from said laser oscillating means and directing the first and second scanning laser beams as first and second scanning beams to an object to be scanned; and
   control means for receiving the monitoring signals output from said laser monitoring means and supplying a control signal for controlling the light amounts of the first and second scanning laser beams from said laser oscillating means to predetermined values in a time-oscillating sharing manner.

8. An apparatus according to claim 7, wherein said laser oscillating means has first and second laser diodes formed on a single semiconductor chip.

9. An apparatus according to claim 8, wherein said laser monitoring means comprises a single photodiode bonded to said semiconductor chip.

10. A multi-beam scanning type image forming apparatus comprising:
    a plurality of light sources each for generating beams;
    optical recording means for recording an image by said beams on an object to be scanned;
    photodetecting means, having a predetermined number of photosensors smaller than that of said plurality of light sources, for detecting light amounts of said beams in a time-sharing manner;
    control means for outputting a control signal for independently controlling the light amounts of the respective beams from said plurality of light sources in accordance with time-sharing light amount detection signals corresponding to the plurality of scanning beams from said predetermined number of photosensors of said photodetecting means; and
    image forming means for developing the image on said object to be scanned which is recorded by said optical recording means and transferring a developed image to an image forming medium.

11. An apparatus according to claim 10, wherein the light amounts of the respective beams generated by said plurality of light sources are independently set.

12. An apparatus according to claim 10, wherein said plurality of light sources comprise a plurality of semiconductor lasers.

13. An apparatus according to claim 12, wherein said plurality of semiconductor lasers are formed on a single chip.

14. An apparatus according to claim 10, wherein the number of said photosensors of said photodetecting means is one.

15. An apparatus according to claim 10, wherein said photosensors of said photodetecting means are provided integrally with said plurality of light sources.

* * * * *